(12) United States Patent
Hayashi

(10) Patent No.: US 9,568,386 B2
(45) Date of Patent: Feb. 14, 2017

(54) MEMS DEVICE WITH PROTECTIVE STRUCTURE

(71) Applicant: KABUSHIKI KAISHA TOSHIBA, Minato-ku, Tokyo (JP)

(72) Inventor: Yumi Hayashi, Zama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/479,144

(22) Filed: Sep. 5, 2014

(65) Prior Publication Data

US 2015/0253212 A1 Sep. 10, 2015

(30) Foreign Application Priority Data

Mar. 5, 2014 (JP) ................................. 2014-042696

(51) Int. Cl.
H01L 29/84 (2006.01)
G01L 9/00 (2006.01)

(52) U.S. Cl.
CPC .................................. G01L 9/0073 (2013.01)

(58) Field of Classification Search
CPC .................................................... G01L 9/0073
USPC ............................................ 438/52; 257/415
See application file for complete search history.

(56) References Cited

U.S. PATENT DOCUMENTS

| 6,091,050 A * | 7/2000 | Carr ..................... H05B 1/0216 219/201 |
| 6,401,545 B1 * | 6/2002 | Monk et al. .................... 73/756 |
| 7,670,861 B2 | 3/2010 | Hanaoka et al. |
| 8,049,287 B2 | 11/2011 | Combi et al. |
| 2006/0098059 A1 * | 5/2006 | Ohguro ................. B81B 3/0018 347/72 |
| 2007/0023890 A1 * | 2/2007 | Haluzak et al. ............... 257/704 |
| 2007/0249082 A1 * | 10/2007 | Hanaoka ............. B81C 1/00246 438/53 |
| 2009/0085205 A1 * | 4/2009 | Sugizaki ................. B81B 7/007 257/737 |
| 2009/0155955 A1 * | 6/2009 | Liang ........................... 438/108 |
| 2010/0206006 A1 * | 8/2010 | Grzybowski et al. .......... 65/102 |
| 2011/0156178 A1 * | 6/2011 | Zuniga-Ortiz ...... B81C 1/00238 257/415 |
| 2013/0001550 A1 * | 1/2013 | Seeger et al. .................... 257/48 |
| 2013/0023082 A1 * | 1/2013 | Martin et al. ................... 438/51 |
| 2013/0234263 A1 * | 9/2013 | Ikehashi ....................... 257/415 |
| 2014/0083617 A1 * | 3/2014 | Taga et al. .................... 156/378 |

(Continued)

FOREIGN PATENT DOCUMENTS

JP 2010025760 A 2/2010
JP 2011106841 A 6/2011

OTHER PUBLICATIONS

U.S. Appl. No. 14/188,342, First Named Inventor: Naofumi Nakamura, Title: "MEMS Device", Filed: Feb. 24, 2014.

*Primary Examiner* — Thanh Y Tran
*Assistant Examiner* — Mohammad M Hoque
(74) *Attorney, Agent, or Firm* — Holtz, Holtz & Volek PC

(57) ABSTRACT

According to one embodiment, a MEMS device includes a variable capacitor including a lower electrode fixed to a substrate and a movable upper electrode provided above the lower electrode, a pressure-sensitive section covering the variable capacitor and connected to the upper electrode, configured to displace according to a pressure applied, and a protective structure provided on an outer side of the pressure-sensitive section.

17 Claims, 6 Drawing Sheets

(56) References Cited

U.S. PATENT DOCUMENTS

2014/0147955 A1* 5/2014 Lee et al. ............... 438/51
2014/0252507 A1* 9/2014 Shankar ............ B81C 1/00293
                                                                     257/415

\* cited by examiner

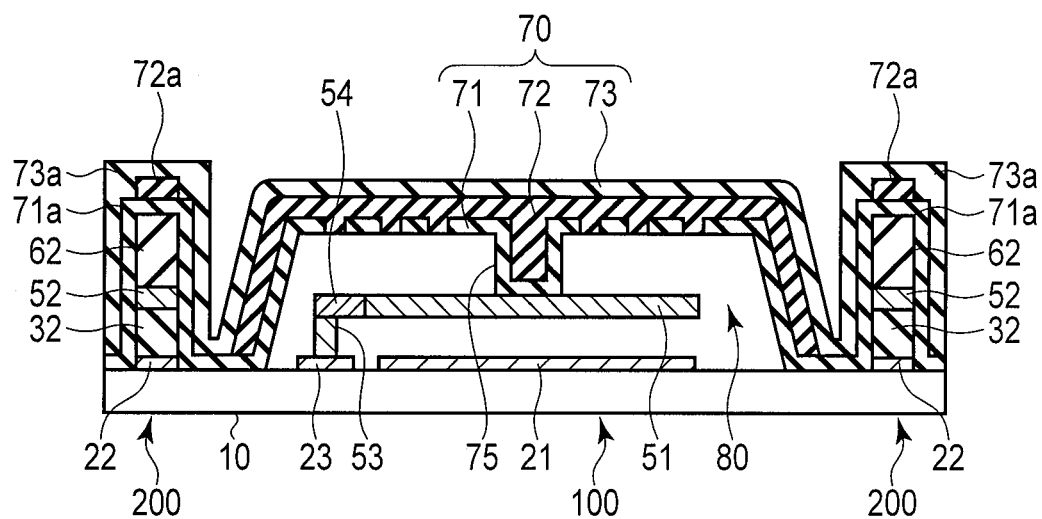
F I G. 1
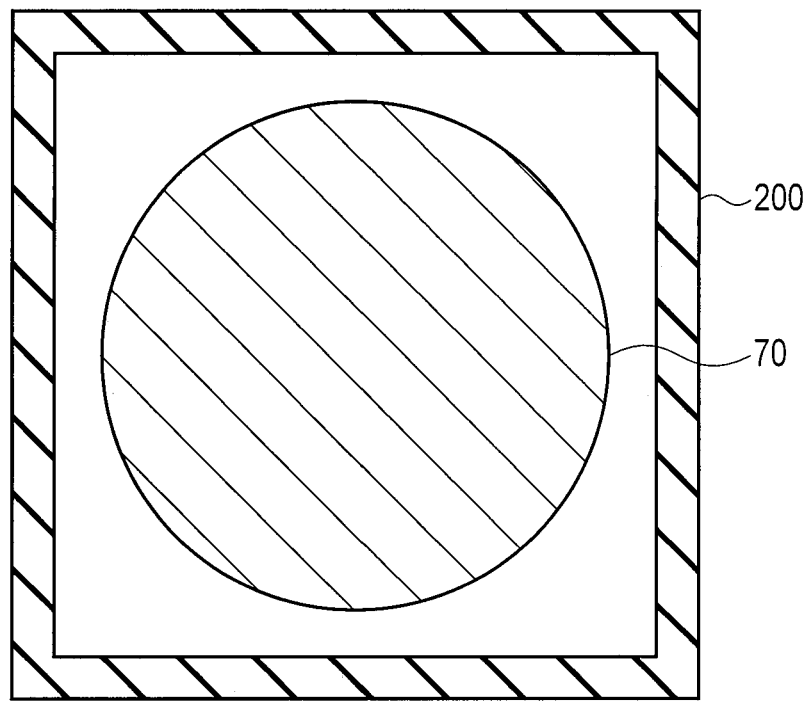
F I G. 2

MEMS DEVICE WITH PROTECTIVE STRUCTURE

CROSS-REFERENCE TO RELATED APPLICATIONS

This application is based upon and claims the benefit of priority from Japanese Patent Application No. 2014-042696, filed Mar. 5, 2014, the entire contents of which are incorporated herein by reference.

FIELD

Embodiments described herein relate generally to a micro-electromechanical system (MEMS) device.

BACKGROUND

A pressure detector which utilizes the MEMS technique has been proposed. This pressure detector employs a variable capacitor. More specifically, the variable capacitor is covered by a pressure sensor (pressure-sensitive film) which displaces according to pressure. The pressure sensor is connected to an upper electrode of the variable capacitor, and the upper electrode of the variable capacitor is displaced according to the displacement of the pressure sensor. With this structure, the capacitance of the variable capacitor varies according to the pressure and thus the pressure can be detected.

The above-described pressure detector contains a cavity within the pressure sensor. Because of this structure, the strength of the pressure sensor is not high. Therefore, if an object contacts thereto, the pressure sensor is adversely affected, making it impossible to perform accurate pressure detection.

Under these circumstances, there is a demand for a MEMS device which can inhibit the contact of an object to the pressure sensor.

BRIEF DESCRIPTION OF THE DRAWINGS

FIG. 1 is a cross-sectional view schematically showing the structure of a MEMS device according to a first embodiment;

FIG. 2 is a plan view schematically showing the structure of the MEMS device according to the first embodiment;

DETAILED DESCRIPTION

Figure 3:
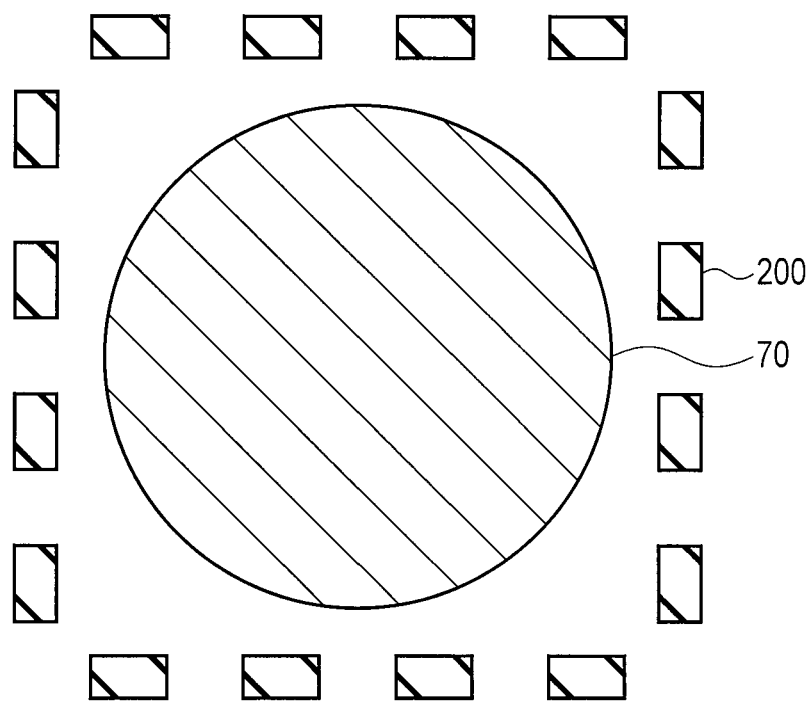
FIG. 3 is a plan view schematically showing the structure of a MEMS device according to a modified version of the first embodiment.

In general, according to one embodiment, a MEMS device includes: a variable capacitor including a lower electrode fixed to a substrate and a movable upper electrode provided above the lower electrode; a pressure-sensitive section covering the variable capacitor and connected to the upper electrode, configured to displace according to a pressure applied; and a protective structure provided on an outer side of the pressure-sensitive section.

Embodiments will now be described with reference to accompanying drawings.

Embodiment 1

FIG. 1 is a cross-sectional view schematically showing the structure of a MEMS device according to the first embodiment, and FIG. 2 is a plan (pattern) view schematically showing the structure of the MEMS device according to the first embodiment. The MEMS device of this embodiment is applied to a pressure detector.

As shown in FIG. 1, a variable capacitor 100 is provided on a substrate 10. The substrate 10 includes a semiconductor substrate, a circuit including a transistor and interconnects, etc., an interlayer insulating film or the like. The variable capacitor 100 includes a fixed lower electrode 21 set on the substrate 10 and a movable upper electrode 51 provided above the lower electrode 21. The lower electrode 21 and upper electrode 51 are formed of a metal material. Further, an interconnect portion 23 is provided on the substrate 10 and an anchor portion 53 is provided on the interconnect portion 23. A spring portion 54 is connected to the anchor portion 53, and the spring portion 54 supports the upper electrode 51. A plurality of spring portions 54 may be provided to support the upper electrode 51. In this case, a plurality of anchor portions 53 connected to the spring portions 54 and a plurality of interconnect portions 23 are provided.

A pressure-sensitive section (diaphragm) 70 is provided on an outer side of the variable capacitor 100. The pressure-sensitive section 70 is formed of a film covering the variable capacitor 100. More specifically, the pressure-sensitive section 70 is formed of a lower-layer film 71, a middle-layer film 72 and an upper-layer film 73. The lower-layer film 71 is an insulating film such as a silicon oxide film or a silicon nitride film. The middle-layer film 72 is an organic insulating film such as of polyimide. The upper-layer film 73 is an insulating film such as a silicon nitride film. A part of the pressure-sensitive section 70 constitutes an anchor portion 75, which is connected to the upper electrode 51. The pressure-sensitive section 70 comprises a cavity 80 inside, which is an enclosed space.

If a pressure is applied to the pressure-sensitive section 70 from outside, the pressure-sensitive section 70 displaces according to the pressure applied. When the pressure-sensitive section 70 displaces, the upper electrode 51 is displaced via the anchor portion 75. When the upper electrode 51 displaces, the distance between the upper electrode 51 and the lower electrode 21 changes and accordingly the capacitance of the variable capacitor 100 varies. Therefore, by measuring the capacitance of the variable capacitor 100, the pressure applied to the pressure-sensitive section 70 can be detected.

On an outer side of the pressure-sensitive section 70, a protective structure 200 is provided to be apart from the pressure-sensitive section 70. A purpose of the protective structure 200 is to protect the pressure-sensitive section 70 from being touched by an object coming in from outside, and thus the protective structure 200 is located close to the pressure-sensitive section 70. Further, the upper surface of the protective structure 200 is situated leveled higher than the upper surface of the pressure-sensitive section 70. In other words, the top of the protective structure 200 is leveled higher than the top of the pressure-sensitive section 70. The protective structure 200 has a wall-shaped structure, which continuously surrounds the pressure-sensitive section 70. That is, the protective structure 200, as a single unit, is provided to surround the pressure-sensitive section 70.

The protective structure 200 is formed of a stacked film comprising a plurality of layers 22, 32, 52, 62, 71a, 72a and 73a. The protective structure 200 includes a portion formed of the same material which constitutes the variable capacitor 100. Further, the protective structure 200 includes a portion formed of the same material which constitutes the pressure-sensitive section 70.

Layer 22 which constitutes the protective structure 200 is formed by the same processing step as the formation step for the lower electrode 21, and is formed of the same material as that of the lower electrode 21. Layer 32 is formed by the same step as that of a sacrificial film 31, which will be explained later, and is formed of the same material as that of sacrificial film 31. Layer 52 is formed by the same step as that of the upper electrode 51, which will be explained later, and is formed of the same material as that of the upper electrode 51. Layer 62 is formed by the same step as that of a sacrificial film 61, which will be explained later, and is formed of the same material as that of sacrificial film 61.

Layer 71a is formed by the same step as that of the lower-layer film 71 of the pressure-sensitive section 70 and is formed of the same material as that of the lower-layer film 71. Layer 72a is formed by the same step as that of the middle-layer film 72 of the pressure-sensitive section 70 and is formed of the same material as that of the middle-layer film 72. Layer 73a is formed by the same step as that of the upper-layer film 73 of the pressure-sensitive section 70 and is formed of the same material as that of the upper-layer film 73.

It should be noted that in the section where the variable capacitor 100 and the pressure-sensitive section 70 are provided, the distance between the lower electrode 21 and the upper electrode 51 and the distance between the upper electrode 51 and the lower-layer film 71 are decreased by sacrificial films 31 and 61, later described, are removed. Consequently, as mentioned previously, the upper surface of the protective structure 200 becomes higher in level than the upper surface of the pressure-sensitive section 70.

As described above, according to this embodiment, the protective structure 200 is provided on an outer side of the pressure-sensitive section 70. Thus, the protective structure 200 can protect the pressure-sensitive section 70 from an object which may come in to contact the pressure-sensitive section 70 from the outside. With this structure, adverse effects on the pressure-sensitive section 70, for example, undue deformation of or damage to the pressure-sensitive section 70 can be prevented. Thus, it becomes possible to accurately detect the pressure of the space on the outer side of the pressure-sensitive section 70.

Further, according to this embodiment, the upper surface of the protective structure 200 is leveled higher than the upper surface of the pressure-sensitive section 70. With this structure, the contact of an object from outside to the pressure-sensitive section 70 can be inhibited more effectively. Furthermore, the protective structure 200 surrounds the pressure-sensitive section 70, and therefore the contact of an object from outside to the pressure-sensitive section 70 can be inhibited even more effectively. Moreover, the protective structure 200 is provided apart from the pressure-sensitive section 70, and therefore the pressure-sensitive section 70 can perform accurate pressure-sensing operation without being influenced by the protective structure 200.

Meanwhile, according to this embodiment, the protective structure 200 includes a portion formed of the same material as that constituting the variable capacitor 100. Therefore, the material to form the protective structure 200 can be shared with the variable capacitor 100, making it possible to manufacture the MEMS device efficiently. Also, the protective structure 200 includes a portion formed of the same material as that constituting the pressure-sensitive section 70. Therefore, the material to form the protective structure 200 can be shared with the pressure-sensitive section 70, making it possible to manufacture the MEMS device even more efficiently.

It should be noted that according to the above-described embodiment, the protective structure 200 is formed to surround the pressure-sensitive section 70 continuously as shown in FIG. 2. But it is alternatively possible that the protective structure 200 is formed to surround the pressure-sensitive section 70 discontinuously as shown in FIG. 3. In other words, the protective structure 200 may be formed of a plurality of fragments separated from each other, which are arranged to surround the pressure-sensitive section 70. In this alternative version as well, similar advantageous effects to those described above can be obtained.

Next, a method of manufacturing the MEMS device according to this embodiment will now be described with reference to FIGS. 1, 2 and 4 to 8.

Figure 4:
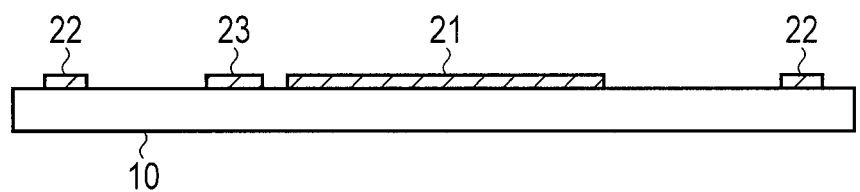
FIG. 4 is a cross-sectional view schematically showing a part of a manufacturing process of the MEMS device according to the first embodiment.

First, as shown in FIG. 4, a lower electrode film of the variable capacitor 100 is formed on the substrate 10. As the lower electrode film, for example, a metal film is used. Subsequently, the lower electrode film is patterned to form the lower electrode 21. At the same time, the pattern of layer 22 which constitutes the protective structure 200, and the interconnect portion 23 are formed as well.

Figure 5:
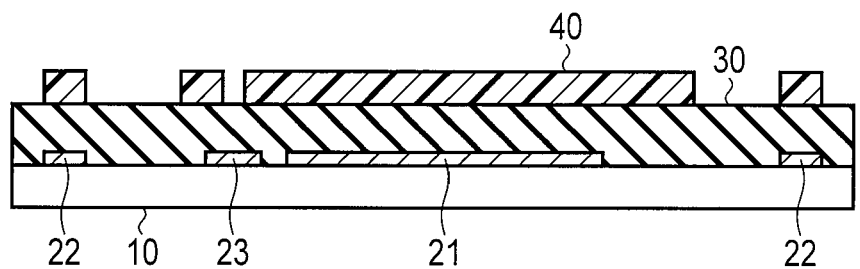
FIG. 5 is a cross-sectional view schematically showing a part of the manufacturing process of the MEMS device according to the first embodiment.

Next, as shown in FIG. 5, a sacrificial film 30 is formed from an organic insulating film such as of polyimide, on the structure shown in FIG. 4. Subsequently, a photoresist pattern 40 is formed on sacrificial film 30.

Figure 6:
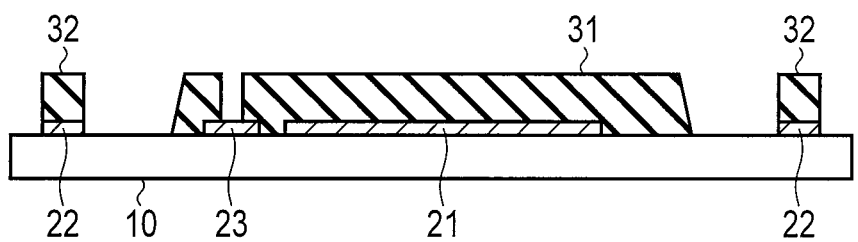
FIG. 6 is a cross-sectional view schematically showing a part of the manufacturing process of the MEMS device according to the first embodiment.

Next, as shown in FIG. 6, sacrificial film 30 is patterned with the photoresist pattern 40 as the mask, thereby forming the pattern of sacrificial film 31. At the same time, the pattern of layer 32 which constitutes the protective structure 200 is formed as well. Then, the photoresist pattern 40 is removed.

Figure 7:
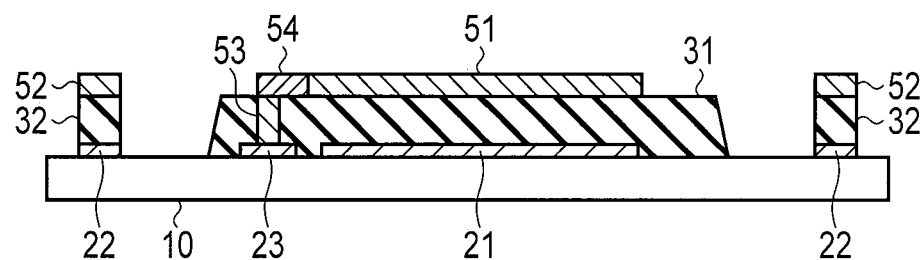
FIG. 7 is a cross-sectional view schematically showing a part of the manufacturing process of the MEMS device according to the first embodiment.

Next, as shown in FIG. 7, an upper electrode film of the variable capacitor 100 is formed on the structure shown in FIG. 6. As the upper electrode film, for example, a metal film is used. Subsequently, the upper electrode film is pattered to form the upper electrode 51. At the same time, the pattern of layer 52 which constitutes the protective structure 200 is formed as well. In the step shown in FIG. 7, the anchor portion 53 and the spring portion 54 are formed as well.

Figure 8:
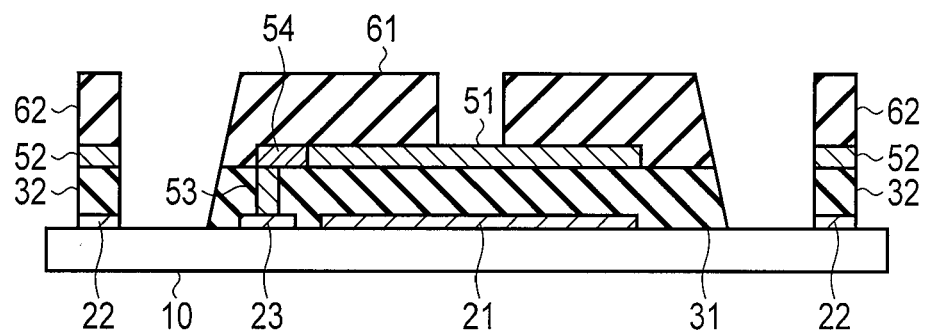
FIG. 8 is a cross-sectional view schematically showing a part of the manufacturing process of the MEMS device according to the first embodiment.
Figure 9:
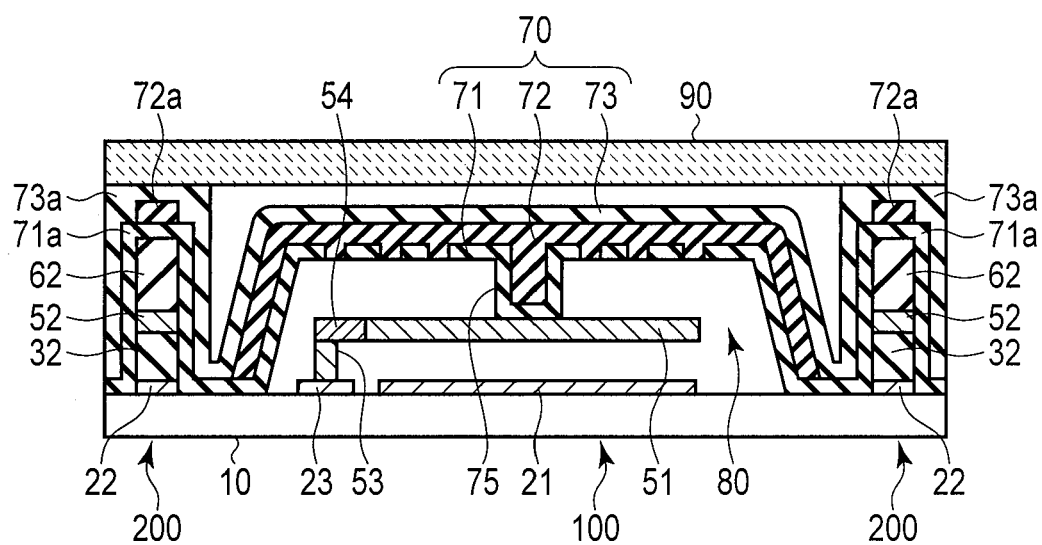
FIG. 9 is a view schematically showing a state in which a tape is affixed by adhesion to a protective structure according to the first embodiment.

Next, as shown in FIG. 8, a sacrificial film is formed from an organic insulating film such as of polyimide, on the structure shown in FIG. 7. Then, the sacrificial film is patterned to form the pattern of sacrificial film 61. At the same time, the pattern of layer 62 which constitutes the protective structure 200 is formed as well.

Next, as shown in FIG. 1, the lower-layer film 71 of the pressure-sensitive section 70 is formed from an insulating film such as a silicon oxide film or a silicon nitride film, on the structure shown in FIG. 8. Subsequently, a plurality of holes are made in the lower-layer film 71. Further, ashing is performed through these holes to remove sacrificial films 31 and 61. Since the holes are not formed in the region of the lower-layer film 71, where the protective structure 200 is formed, the portions of sacrificial films 31 and 61, which correspond to the region where the protective structure 200 is formed, are not removed. Thus, in the region where the protective structure 200 is formed, layers 32 and 62 formed of the respective sacrificial films remain.

Next, the middle-layer film 72 of the pressure-sensitive section 70 is formed from an organic insulating film such as of polyimide, on the structure in which the lower electrode 71 and the like are formed. With the middle-layer film 72, the holes made in the lower-layer film 71 are sealed. Subsequently, the middle-layer film 72 is patterned.

Next, the upper-layer film 73 of the pressure-sensitive section 70 is formed from an insulating film such as a silicon nitride film, on the structure in which the middle-layer film 72 and the like are formed.

Thus, the variable capacitor 100, the pressure-sensitive section 70 and the protective structure 200 are formed. The protective structure 200 comprises a stacked film of a plurality of layers 22, 32, 52, 62, 71a, 72a and 73a. Further, the cavity 80 is formed inside the pressure-sensitive section 70.

It should be noted that with the removal of sacrificial films 31 and 61, the distance between the lower electrode 21 and the upper electrode 51 and the distance between the upper electrode 51 and the lower-layer film 71 are decreased. Consequently, the upper surface of the protective structure 200 becomes higher in level than the upper surface of the pressure-sensitive section 70.

With the above-described processing steps, the structure as shown in FIGS. 1 and 2 is formed.

According to the manufacturing method of this embodiment, the step of forming the protective structure 200 comprises a step carried out simultaneously with the step of forming the variable capacitor 100. Also, the step of forming the protective structure 200 comprises another step carried out simultaneously with the step of forming the pressure-sensitive section 70. For this reason, without adding a special processing step, the protective structure 200 can be formed. Thus, the production process can be simplified.

Moreover, the protective structure 200 includes portions formed of the same materials as those of sacrificial films 31 and 61 used to form the cavity 80 inside the pressure-sensitive section 70. Meanwhile, in the region where the variable capacitor 100 and the protective structure 200 are formed, the respective portions of sacrificial films 31 and 61 are removed. Therefore, the upper surface of the protective structure 200 can be leveled higher than the upper surface of the pressure-sensitive section 70.

Next, the steps after forming the structure shown in FIGS. 1 and 2 will now be described. After forming the structure shown in FIGS. 1 and 2, steps such as back-side grinding (BSG), dicing and bonding are carried out. In these steps, when the protective structure 200 is already formed, the pressure-sensitive section 70 can be protected from an object from the outside to touch the pressure-sensitive section 70. Therefore, the adverse effect on the pressure-sensitive section 70 can be prevented.

For example, in the BSG step, a tape 90 is attached onto the front surface side of the substrate and the substrate (semiconductor wafer) is polished from the rear surface side for thinning. Let us suppose here that the protective structure 200 is not formed at this stage. In this case, the tape is attached to the pressure-sensitive section 70, which may have an adverse effect on the pressure-sensitive section 70. But in this embodiment, with the protective structure 200, the tape is attached onto the protective structure 200, thereby making it possible to prevent the adverse effect on the pressure-sensitive section 70.

Further, the dicing step is carried out generally while applying water thereto. But in the case of a pressure detector, it is not preferable that the pressure-sensitive section 70 being in the form of a film be wetted with water. In this case, by preparing a thin substrate with the BSG step described above, it becomes possible to apply laser dicing, which does not use water.

In the case where the dicing is carried out on the substrate and is started from the rear surface side thereof, a tape must be affixed by adhesion to the front surface side of the substrate. In this case as well, with the tape attached to the protective structure 200, the pressure-sensitive section 70 can be prevented from being adversely affected.

After finishing the BSG steps, etc., the tape is peeled off from the protective structure 200. While peeling off the tape, a portion or an entirety of the protective structure 200 may possibly be removed with the tape.

Figure 10:
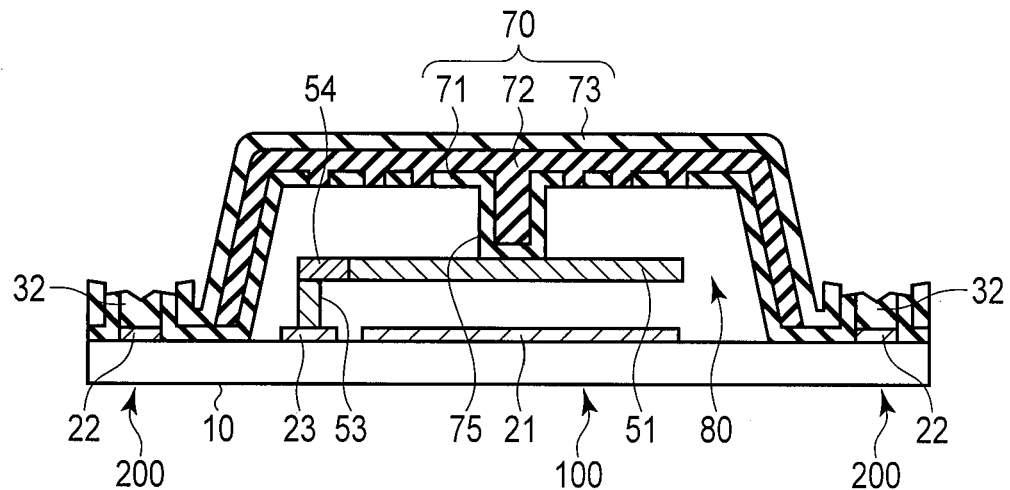
FIG. 10 is a view schematically showing a state in which a tape has been detached from a protective structure according to the first embodiment.

FIG. 10 is a view schematically showing the case where a portion of the protective structure 200 is removed with the tape while peeling off the tape. Here, the protective structure 200 is formed of a plurality of layers, and usually, the removal of the portion of the protective structure 200 occurs from the section of the lowest adhesiveness in the layers. Note that it is alternatively possible that another layer of poor adhesiveness is formed in advance in the protective structure 200 in order to have the portion of the protective structure 200 removed from this layer of poor adhesiveness.

Figure 11:
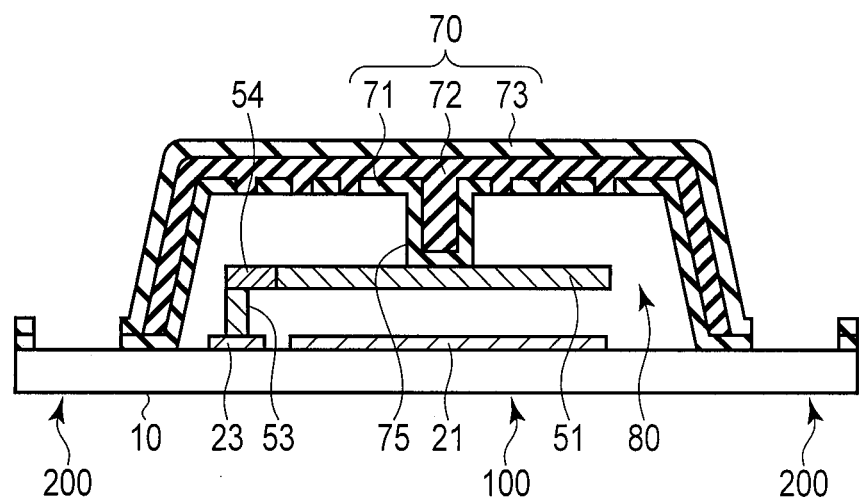
FIG. 11 is a view schematically showing another example of a state in which a tape has been detached from a protective structure according to the first embodiment.

FIG. 11 is a view schematically showing the case where an entirety of the protective structure 200 is removed with the tape while peeling off the tape therefrom. In this case, discontinuous sections are formed in the stacked film.

Even if a portion or an entirety of the protective structure 200 is removed with the tape, a tape will never be attached to the pressure-sensitive section 70 as long as there is no tape affixing step thereafter. Therefore, even if a portion or an entirety of the protective structure 200 is removed with the tape, the pressure-sensitive section 70 can be prevented from being adversely affected.

Embodiment 2

The second embodiment will now be described. A MEMS device of this embodiment is applied to a pressure detector as in the first embodiment. Note that the basics structure and manufacturing process of this embodiment are similar to those of the first embodiment, and therefore the descriptions of the items already provided in the first embodiment will be omitted.

Figure 12:
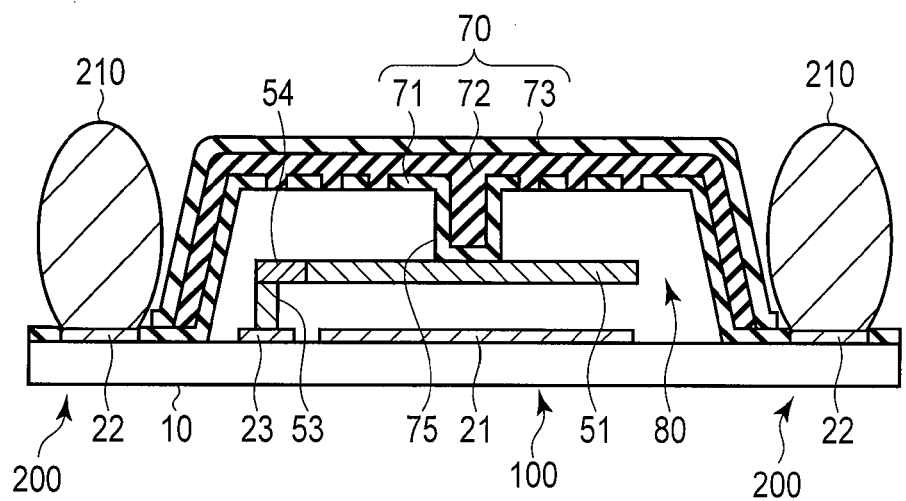
FIG. 12 is a cross-sectional view schematically showing the structure of a MEMS device according to a second embodiment.
Figure 13:
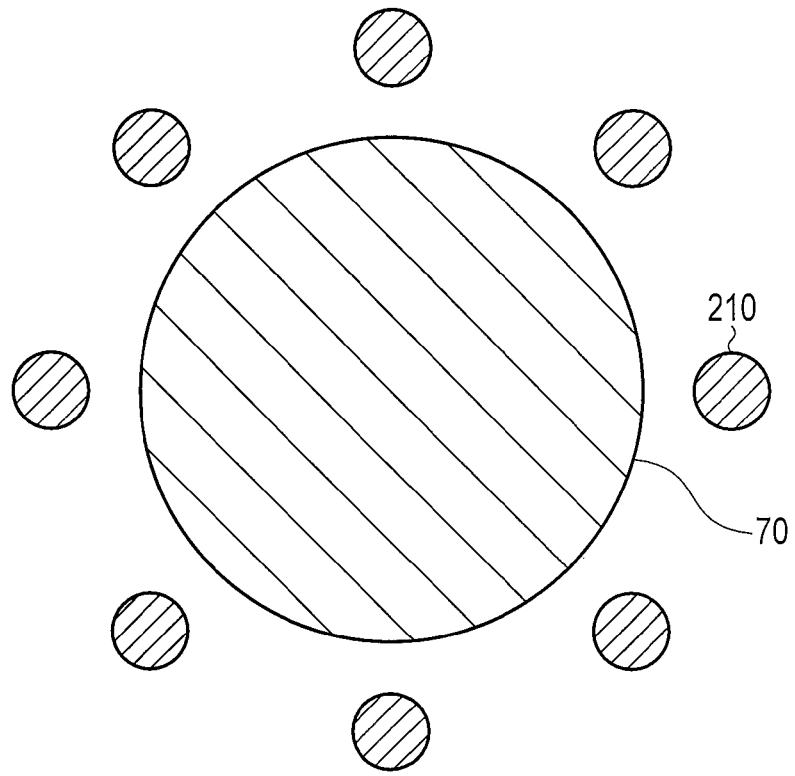
FIG. 13 is a plan view schematically showing the structure of the MEMS device according to the second embodiment.

FIG. 12 is a cross-sectional view schematically showing the structure of a MEMS device according to this embodiment, and FIG. 13 is a plan (pattern) view schematically showing the structure of the MEMS device according to this embodiment. The structural elements corresponding to those shown in FIGS. 1 and 2 will be designated by the corresponding reference numbers, respectively, and the explanations thereof will be omitted.

In this embodiment, bumps 210 are formed in place of the protective structure 200. More specifically, a plurality of bumps 210 are provided on an outer side of a pressure-sensitive section 70 such as to be apart from the pressure-sensitive section 70. As in the case of the protective structure 200 of the first embodiment, a purpose of the bumps 210 is to protect the pressure-sensitive section 70 from being touched by an object from outside, and thus the bumps 210 are located close to the pressure-sensitive section 70. Further, the upper surfaces of the bumps 210 are situated higher in level than the upper surface of the pressure-sensitive section 70. In other words, the tops of the bumps 210 are located higher in level than the top of the pressure-sensitive section 70. The bumps 210 are provided to discontinuously surround the pressure-sensitive section 70.

Here, the bumps 210 should preferably be arranged to be symmetrical with respect to a predetermined imaginary line passing through the center of the pressure-sensitive section 70. With the symmetrical arrangement of the bumps 210, the protecting function for the pressure-sensitive section 70 can be effectively exhibited.

The bumps 210 are formed after the formation of the pressure-sensitive section 70. The basic processing steps before the formation of the bumps 210 are similar to those of the first embodiment.

As described above, when the bumps are used as a protective structure, an advantage similar to those described in the first embodiment can be obtained.

It should be noted that in the first and second embodiments described above, the anchor portion 75 is provided in the pressure-sensitive section 70, and the main body of the pressure-sensitive section 70 is connected via the anchor portion 75 to the upper electrode 51 of the variable capacitor 100. But it is alternatively possible that the lower surface of the pressure-sensitive section 70 is directly connected to the upper electrode 51 of the variable capacitor 100 without providing the anchor portion 75. In this case as well, advantages similar to those described in the first and second embodiments can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A MEMS device comprising:
   a variable capacitor including a lower electrode fixed to a substrate and a movable upper electrode provided above the lower electrode;
   a pressure-sensitive section covering the variable capacitor and connected to the upper electrode, the pressure-sensitive section defining a cavity therein to accommodate the variable capacitor; and
   a protective structure provided on an outer side of the pressure-sensitive section,
   wherein a gap is provided between the pressure-sensitive section and the protective structure, wherein the protective structure comprises a plurality of layers including a first organic insulating layer, a second organic insulating layer, and a third layer provided between the first and second organic insulating layers.

2. The MEMS device of claim 1, wherein an upper surface of the protective structure is located higher in level than an upper surface of the pressure-sensitive section.

3. The MEMS device of claim 1, wherein the protective structure is situated apart from the pressure-sensitive section.

4. The MEMS device of claim 1, wherein the protective structure has a wall-shaped structure.

5. The MEMS device of claim 1, wherein the protective structure continuously surrounds the pressure-sensitive section.

6. The MEMS device of claim 1, wherein the protective structure discontinuously surrounds the pressure-sensitive section.

7. The MEMS device of claim 1, wherein the protective structure includes a portion made of a same material as a material constituting the variable capacitor.

8. The MEMS device of claim 1, wherein the protective structure includes a portion made of a same material as a material constituting the pressure-sensitive section.

9. The MEMS device of claim 1, wherein the third layer is made of a same material as a material of the movable upper electrode.

10. A MEMS device comprising:
    a variable capacitor including a lower electrode fixed to a substrate and a movable upper electrode provided above the lower electrode;
    a pressure-sensitive section covering the variable capacitor and connected to the upper electrode, the pressure-sensitive section defining a cavity therein to accommodate the variable capacitor; and
    a protective structure provided on an outer side of the pressure-sensitive section,
    wherein the protective structure comprises a plurality of bumps discontinuously surrounding the pressure-sensitive section, and tops of the bumps are located higher in level than a top of the pressure-sensitive section, and
    wherein the pressure-sensitive section includes an anchor portion which is in contact with a part of the upper electrode, and the pressure-sensitive section is spaced apart from the upper electrode except for the anchor portion.

11. The MEMS device of claim 10, wherein an upper surface of the protective structure is located higher in level than an upper surface of the pressure-sensitive section.

12. The MEMS device of claim 10, wherein the protective structure is situated apart from the pressure-sensitive section.

13. The MEMS device of claim 1, wherein the protective structure is situated apart from the upper electrode.

14. The MEMS device of claim 1, wherein the pressure-sensitive section includes an anchor portion which is in contact with a part of the upper electrode, and the pressure-sensitive section is spaced apart from the upper electrode except for the anchor portion.

15. The MEMS device of claim 1, wherein the pressure-sensitive section comprises a plurality of layers, and an uppermost layer of the protective structure is made of a same material as a material of an uppermost layer of the pressure-sensitive section.

16. The MEMS device of claim 1, wherein the pressure-sensitive section defines a closed space therein in which the variable capacitor is accommodated.

17. The MEMS device of claim 10, wherein the pressure-sensitive section defines a closed space therein in which the variable capacitor is accommodated.

\* \* \* \* \*